(12) United States Patent
Dai et al.

(10) Patent No.: US 12,175,744 B2
(45) Date of Patent: *Dec. 24, 2024

(54) SYSTEMS AND METHODS FOR INTERACTIVE IMAGE SCENE GRAPH PATTERN SEARCH AND ANALYSIS

(71) Applicant: Robert Bosch GmbH, Stuttgart (DE)

(72) Inventors: Zeng Dai, Santa Clara, CA (US); Huan Song, San Jose, CA (US); Panpan Xu, Santa Clara, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 395 days.

This patent is subject to a terminal disclaimer.

(21) Appl. No.: 17/478,423

(22) Filed: Sep. 17, 2021

(65) Prior Publication Data

US 2023/0089148 A1    Mar. 23, 2023

(51) Int. Cl.
*G06T 7/11* (2017.01)
*G06F 16/55* (2019.01)
(Continued)

(52) U.S. Cl.
CPC .............. *G06V 20/17* (2022.01); *G06F 16/55* (2019.01); *G06F 16/5854* (2019.01);
(Continued)

(58) Field of Classification Search
None
See application file for complete search history.

(56) References Cited

U.S. PATENT DOCUMENTS 9,959,647 B1 * 5/2018 Brost ................... G06V 10/426
2020/0401835 A1   12/2020 Zhao et al.
(Continued)

FOREIGN PATENT DOCUMENTS

| CN | 112069336 A | * 12/2020 | ........... G06F 16/532 |
| EP | 3819790 A2 | 5/2021 | |
| WO | WO-2021042084 A1 | * 3/2021 | ......... G06F 16/5854 |

OTHER PUBLICATIONS

Bai, Y.—"SimGNN: A Neural Network Approach to Fast Graph Similarity Computation"—WSDM—Feb. 2019, pp. 384-392 (Year: 2019).*

(Continued)

*Primary Examiner* — Bernard Krasnic
(74) *Attorney, Agent, or Firm* — Dickinson Wright PLLC (57) ABSTRACT

Methods and systems for providing an interactive image scene graph pattern search are provided. A user is provide with an image having a plurality of selectable segmented regions therein. The user selects one or more of the segmented regions to build a query graph. Via a graph neural network, matching target graphs are retrieved that contain the query graph from a target graph database. Each matching target graph has matching target nodes that match with the query nodes of the query graph. Matching target images from an image database are associated with the matching target graphs. Embeddings of each of the query nodes and the matching target nodes are extracted. A comparison of the embeddings of each query node with the embeddings of each matching target node is performed. The user interface displays the matching target images that are associated with the matching target graphs.

17 Claims, 8 Drawing Sheets

(51) Int. Cl.
G06F 16/58 (2019.01)
G06F 16/583 (2019.01)
G06V 10/82 (2022.01)
G06V 10/86 (2022.01)
G06V 20/17 (2022.01)
G06V 20/56 (2022.01)
G06V 30/196 (2022.01)

(52) U.S. Cl.
CPC .......... *G06F 16/5866* (2019.01); *G06T 7/11* (2017.01); *G06V 10/82* (2022.01); *G06V 10/86* (2022.01); *G06V 20/56* (2022.01); *G06V 30/1988* (2022.01)

(56) References Cited

U.S. PATENT DOCUMENTS

| | | | | |
|---|---|---|---|---|
| 2021/0263962 | A1* | 8/2021 | Chang | G06F 18/2431 |
| 2022/0058429 | A1* | 2/2022 | Zou | G06V 10/82 |
| 2022/0391433 | A1* | 12/2022 | Maheshwari | G06N 3/0464 |
| 2023/0086327 | A1* | 3/2023 | Song | G06F 16/242 382/159 |
| 2023/0089148 | A1 | 3/2023 | Dai et al. | |

OTHER PUBLICATIONS

Kong, X.—"Semantic Graph Based Place Recognition for 3D Point Clouds"—arXiv—Aug. 26, 2020—pp. 1-8 (Year: 2020).*

J. Shotton, J. Winn, C. Rother, and A. Criminisi. Textonboost: Joint appearance, shape and context modeling for multi-class object recognition and segmentation. In European conference on computer vision, pp. 1-15. Springer, 2006.

Z. Lou, J. You, C. Wen, A. Canedo, J. Leskovec, et al. Neural subgraph matching. arXiv preprint arXiv:2007.03092, 2020.

W. L. Hamilton, R. Ying, and J. Leskovec. Inductive representation learning on large graphs. arXiv preprint arXiv:1706.02216, 2017.

L. P. Cordella, P. Foggia, C. Sansone, and M. Vento. A (sub) graph isomorphism algorithm for matching large graphs. IEEE Transactions on Pattern Analysis and Machine Intelligence, 26(10):1367-1372, 2004.

J. Munkres. Algorithms for the assignment and transportation problems. Journal of the society for industrial and applied mathematics, 5(1):32-38, 1957.

M. Neumann, R. Garnett, C. Bauckhage, and K. Kersting. Propagation kernels: efficient graph kernels from propagated information. Mach. Learn., 102(2):209-245, 2016.

J. R. Ullmann. An algorithm for subgraph isomorphism. Journal of the ACM (JACM), 23(1):31-42, 1976.

X. Gao, B. Xiao, D. Tao, and X. Li. A survey of graph edit distance. Pattern Analysis and applications, 13(1):113-129, 2010.

L. Van der Maaten and G. Hinton. Visualizing data using t-sne. Journal of machine learning research, 9(11), 2008.

E. R. Gansner, E. Koutsofios, S. C. North, and K.-P. Vo. A technique for drawing directed graphs. IEEE Transactions on Software Engineering, 19(3):214-230, 1993.

Ying et al., "Neural Subgraph Matching," Oct. 27, 2020, pp. 1-16.

Yunsheng Bai et al. "SimGNN: A Neutral Network Approach to Fast Graph Similarity Computation." Session 6: Networks and Social Behavior, WSDM Feb. 11-15, 2019, pp. 384-392.

Xavier Cortes et al., "Active Graph Matching Based on Pairwaise Probabilities between Nodes." Consolider Ingenio 2010: project CSD2007-00018 & CICYT Project DPI 2010-17112, SSPR & SPR 2012, LNCS 7626, pp. 98-106.

Xin Kong et al., "Semantic Graph Based Place Recognition for 3D Point Clouds." arXin:2008.11459v1 [cs. CV] Aug. 26, 2020, 8 Pages.

* cited by examiner

Stats And Filters:

Nodes

Links

Graph Types

SYSTEMS AND METHODS FOR INTERACTIVE IMAGE SCENE GRAPH PATTERN SEARCH AND ANALYSIS

CROSS-REFERENCE TO RELATED APPLICATIONS

The present application is related to co-pending application Ser. No. 17/478,478, titled SYSTEMS AND METHODS OF INTERACTIVE VISUAL GRAPH QUERY FOR PROGRAM WORKFLOW ANALYSIS, filed on the same date as the present application by the same Applicant. The co-pending application Ser. No. 17/478,478 is not prior art to the present disclosure, but its disclosure is hereby incorporated by reference in its entirety.

TECHNICAL FIELD

The present disclosure relates to systems and methods for performing an interactive image scene graph pattern search.

BACKGROUND

A variety of techniques exist for organizing resources, describing relationships, and otherwise storing data about things represented electronically. One such technique is the use of graph structures, or graphs. Graphs are non-linear data structures having nodes and edges. The nodes are sometimes referred to as vertices, and the edges are lines or arcs that connect any two nodes in the graph. Two different graphs can be compared and corresponded for analysis in similarities by matching one graph (or a portion thereof) to another graph (or a portion thereof).

A Graph Neural Network (GNN) is a type of neural network which directly operates on the graph structure. A typical application of GNN is node classification, in which every node in the graph is associated with a label. The GNN can then function to compare the graphs or portions thereof where nodes and neighboring nodes can be compared. Graph context and labels of nodes can be predicted using aggregated information.

With respect to images, semantic scene graphs can encode semantic objects (e.g., person, vehicle, building) as nodes connected by their relationships (e.g., near to) as edges. Semantic scene graphs of images can be extracted when searching for certain objects and/or relationships in an image, for example. For example, a user may wish to find images having pedestrians (object) walking on a sidewalk (relationship to another object). Scene graphs enable a search for such objects and relationships in images.

SUMMARY

According to a first embodiment, a computer-implemented method for performing an interactive image scene graph pattern search includes providing a user with an image having a plurality of segmented regions that are able to be selected by the user via a user interface, receiving a selection of one or more of the segmented regions via the user interface, building a query graph based on the selected segmented regions, wherein each of the one or more of the segmented regions selected by the user corresponds to a query node of the query graph, via a graph neural network, retrieving matching target graphs that contain the query graph from a target graph database, wherein each matching target graph has matching target nodes that match with the query nodes of the query graph, retrieving matching target images from an image database that are associated with the matching target graphs, extracting embeddings of each of the query nodes and each of the matching target nodes, performing a comparison of the embeddings of each query node with the embeddings of each matching target node, and displaying on the user interface the matching target images that are associated with the matching target graphs along with a graphical depiction of the query nodes and the matching target nodes.

According to a second embodiment, a system is configured to support interactive image scene graph searching. The system includes a user interface, a memory storing a target graph database having a plurality of target graphs, each target graph having a plurality of target nodes connected by edges, the memory further storing a target image database having a plurality of target images, each target image associated with a respective one of the target graphs, and a processor. The processor is programmed to, via the user interface, determine a query graph based on a user selecting a plurality of segmented regions of an image, wherein each selected segmented region corresponds with a query node of the query graph, retrieve one or more matching target graphs from the target graph database, wherein each of the one or more matching target graphs contains the query graph, and display on the user interface one or more matching target images from the target image database that are associated with the matching target graphs.

According to a third embodiment, a system includes a memory storing a target graph database having a plurality of target graphs, each target graph having a plurality of target nodes connected by edges, and a processor communicatively connected to the memory. The processor is programmed to display an image on a user interface, the image having a plurality of objects that are able to be selected by a user, build a query graph having a plurality of query nodes associated with the objects selected by the user, retrieve one or more matching target graphs from the target graph database, wherein each of the one or more matching target graphs contains the query graph, determine a similarity between the query nodes and the target nodes of the one or more matching target graphs with a one-to-one node correspondence, retrieve one or more matching images from an image database that are associated with the matching target graphs, and display the one or more matching images on the user interface along with a graphical depiction of the one-to-one node correspondence.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A graph is a data structure consisting of two components—nodes (or vertices) and edges. The nodes may consist or be embedded with associated data such as a classification, and the edges connect adjacent nodes. Graph data structures can be applied in a variety of real-world applications, such as business processes, control flow graphs in programs, social connections, knowledge graphs, and semantic scene graphs in image analysis. Visually identifying and searching for persistent subgraph patterns is a common and important task in graph analysis. For example, searching for graph motifs such as cliques or stars in a social network reveals the community structures or influencers; searching for similar workflow templates helps streamline or simply business processes; searching for images with similar scene graphs helps systematic retrieval of training/testing cases to develop models for computer vision tasks.

This disclosure provides a visual analytics system to support human-in-the-loop, example-based subgraph pattern search in a database containing many individual workflow graphs. The approach disclosed herein goes beyond a predefined set of motifs and allows users to interactively specify the patterns or subgraphs of interest. However, most combinatorial algorithms are not well-suited for interactive queries from a human. This disclosure therefore uses graph neural networks (GNNs) to encode topological and node attributes in a graph as fixed length latent vector representations. Subgraph matching is therefore performed in the latent space, which significantly speeds up the query process. Furthermore, the complexity of the subgraph matching problem also makes it difficult to obtain accurate one-to-one node correspondence in the matching results, which is crucial for visualization and interpretation. This disclosure therefore provides a novel GNN for node-alignment which can directly output one-to-one node correspondence between the query graph and the target graphs. The user is able to easily validate and interpret the query results by visualizing the node correspondence and comparison. The visual analytics system provides a visual query interface with a query editor and multi-scape visualization of the results, as well as user feedback mechanisms for refining the results with additional constraints.

The systems and methods disclosed herein provide a novel framework for interactive visual graph pattern searching via graph representation learning. This disclosure leverages GNNs to encode topological as well as node attribute information in a graph as fixed-length vectors. The GNNs are applied to both a query graph and the target graphs stored in memory to obtain their respective vector representations. The graph matching is transformed into a high-dimensional vector comparison problem, which greatly reduces the computational complexity. In particular, two separate GNNs can be leveraged, with a first GNN to address a first problem in determining whether a query pattern exists in a graph, and a second GNN to address a second problem in finding the one-to-one node correspondence between the query graph and target graphs. For the first problem, a subgraph matching system (referred to as NeuroMatch) is leveraged. For the second problem, an alignment system (referred to as NeuroAlign) is leveraged. The NeuroAlign system can directly generate cross-graph node-to-node attention scores indicating the node correspondences. In some applications, vector representations of the query targets can be precomputed and stored for efficient retrieval of the graph matching results. The visualization interface enables easy search and specification of the graph query patterns. Since the query engine can return a large number of matching target graphs that contain the query graph, the results can be presented with different levels of details that show the matching target graphs in space-efficient, thumbnail style representations. They can also be sorted via a variety of criteria. Users can also interactively specify additional constraints to further filter the returned results based on their domain knowledge.

Graph structure models a wide range of processes and relations in real-world applications. This disclosure in particular considers graphs describing an example of a real-world application in the form of image classification and segmentation, with nodes representing objects or items in the image, and the edges representing their relationship to other objects. This disclosure provides a system to support human-in-the-loop, example-based image semantic subgraph pattern search in an image database. Such a system can be very useful for many computer vision tasks such as image retrieval, visual question answering, relationship modeling, and image generation. This disclosure provides a new way to search similar images with subgraphs of images indexed by their semantic scene graph instead of semantic key words. To perform interactive visual patter queries on image semantic scenes, the system described herein utilizes NeuroMatch together with NeuroAlign to obtain significant accurate one-to-one semantic scene graph matches with user-defined attributes. The user interface also enables intuitive and efficient image subgraph query creation and result exploration.

Images can be interpreted as many relationships among interconnected objects in them. Semantic scene graph encodes semantic objects (e.g., person, animal, sign, vehicle, stoplight, building, etc.) as nodes connected by their relationship (e.g., near, next to) as edges. Extracting semantic scene graph of images is an important approach to understanding images. In image search tasks, users usually are not only interested in object matching but also relationships. For example, a user may want to find all images with pedestrians walking on a crosswalk. To enable such a query, the system disclosed herein indexes the images by their semantic scene graph and uses subgraph matching algorithms to efficiently retrieve images of interest in the database (e.g., target images).

Figure 1:
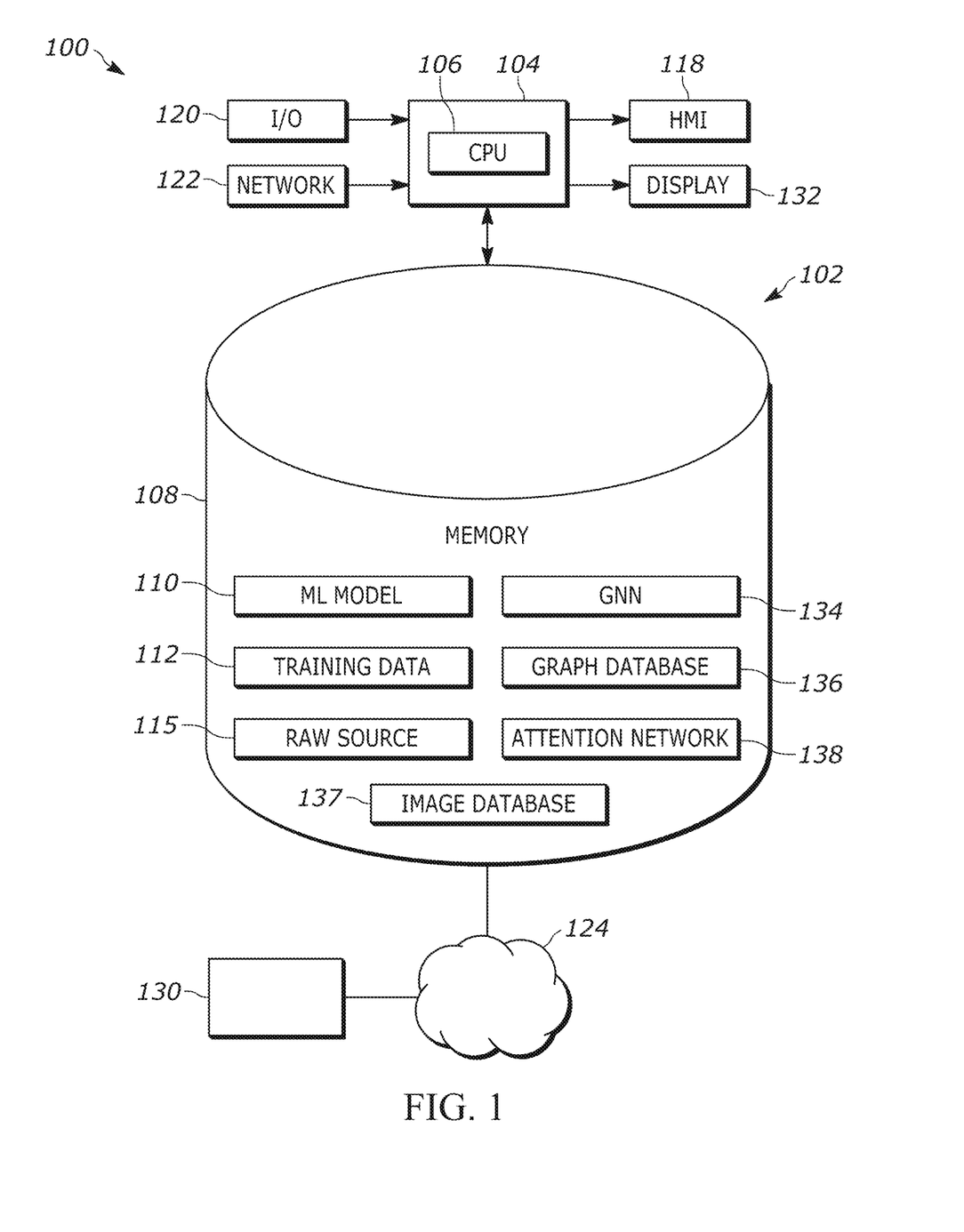
FIG. 1 is a schematic diagram of a system that performs subgraph pattern searching with human-in-the-loop visual analytics, according to an embodiment.

FIG. 1 is a schematic diagram of a visual analytics system 100 that performs subgraph pattern searching with human-in-the-loop visual analytics, according to an embodiment. The system 100 may include at least one computing system 102. The computing system 102 may include at least one processor 104 that is operatively connected to a memory unit 108, or memory. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115, one or more GNNs 134, a graph database 136, an image database 137, and an attention network 138.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124. The one or more servers 130 may have the memory and processors configured to carry out the GNNs and systems disclosed herein.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122. The HMI 118 and display 132 may collectively provide a user interface to the user, which allows interaction between the human user and the processor(s) 104.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors, and the system illustrated in FIG. 1 is merely an example.

The system 100 may implement a machine-learning algorithm 110 that is configured to analyze the raw source dataset 115. The raw source dataset 115 may include raw or unprocessed sensor data or image data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify items (e.g., pedestrians, signs, buildings, sky, road, etc.) in images or series of images (e.g., video), and even annotate the images to include labels of such items. The neural network algorithms of the machine-learning algorithm 110 may include GNN, although the GNNs disclosed herein are illustrated as a separate component in memory 108. The machine-learning algorithms 110 and/or GNN may take as input a query graph having a plurality of nodes (e.g., types of objects in the image) connected by edges (e.g., the relationship between those objects), and search for and retrieve corresponding target graphs from the graph database that include the query graph as a subgraph within the stored target graph. The image database 137 contains a plurality of stored images that correspond to the target graphs. Each image in the image database 137 can have pre-defined segmented regions and associated nodes as determined from prior human labeling or machine-learning processes. When a target graph is found to contain the query graph, one of the images from the image database 137 that is associated with the target graph can be retrieved as described herein.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source images or videos with and without items in the scene and corresponding presence and location information of the item.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations, latent variables, adversarial noise, etc.) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The GNN 134 is a neural network that directly operates on the graph structures stored in graph database 136 (e.g., target graphs) as well as input query graphs. Each node in the graphs are associated with a label. For example, in the context of a stored image, nodes may include labels for pedestrians, signs, buildings, the sky, roads, and the like that are found in the image. The graph structures stored in the graph database 136 may have these labels stored as ground truth, while the input query graphs may include a graph with a desired node or nodes, wherein the GNN is configured to operate to search the target graphs stored in the graph database 126 that include the query graph as a subset within the target graphs. The attention network 138 includes processing techniques for the GNN that allows the GNN to focus on specific aspects of a complex input, one at a time until the entire dataset is categorized.

Figure 2:
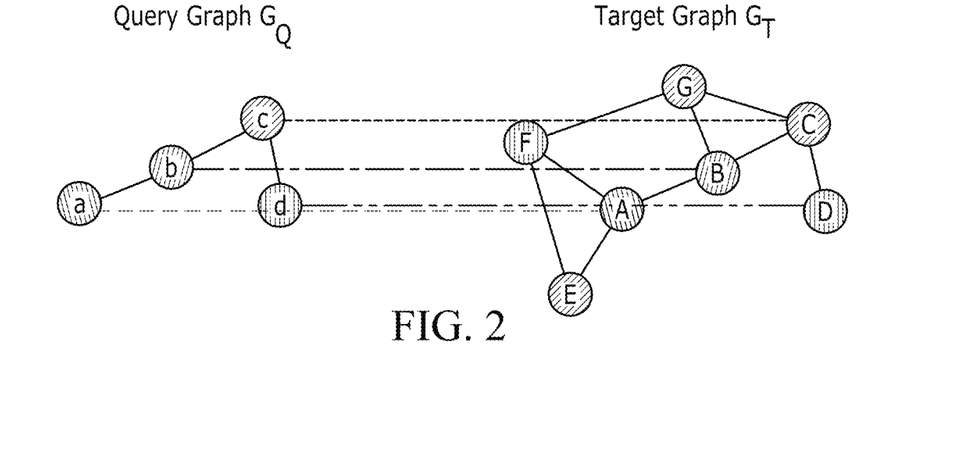
FIG. 2 is a diagram illustrating subgraph matching between a query graph and a target graph, according to an embodiment.

The system is configured to match a query graph with one or more target graphs stored in the graph database 136. Each graph includes vertices and edges. An undirected, connected graph can be denoted $G=(V, E)$ with vertex set V and edge set E, X as the features associated with V (e.g., categorical attributes). FIG. 2 provides a visual illustration of the subgraph matching process. The user can input (e.g., via HMI 118) a query graph $G_Q$ that includes one or more nodes. In this example, four nodes are input, nodes a, b, c, and d. For example, the user may desire to find all images having visible the sky (node a), a building (node b), a road (node c) and a tree (node d). Various target graphs $G_T$ are stored in memory. Given a query graph and a target graph, the decision problem determines whether there exists a subgraph $H_T \in G_T$, such that $G_Q$ is isomorphic to $H_T$. When $H_T$ exists (i.e., $G_Q$ is subgraph-isomorphic to $G_T$), the system considers the node alignment problem which looks for an injective mapping function $f: V_Q \to V_T$ such that $\{(v), (u)\} \in E_T$ if $\{v,\} \in E_Q$. When the node features X exist, the matching requires equivalence of the feature too. Referring to the example in FIG. 2, each node is colored where the colors encode node categorical features (e.g., sky, building, road, tree, etc.) and the letters are the node names. The example query graph $G_Q$ is a subgraph of $G_T$ with the correct node alignment of (a)=A, (b)=B, $f$(c)=C, $f$(d)=D. The target graph database 136 may be large, where the task is to solve the above decision problem and node-alignment problem for each of the target graphs.

As will further be described with reference to the remaining Figures, the backend portion of the system can include two main components: NeuroMatch (e.g., subgraph matching of a query graph $G_Q$ to at least a portion of a target graph $G_T$) and NeuroAlign (e.g., node alignment). Given a graph database 136 and user-created query graph, the system 100 utilizes the NeuroMatch method to efficiently retrieve matching target graphs which contain the query graph. NeuroMatch decomposes the graphs into small neighborhoods to make fast decisions locally and then aggregates the results. After a matching target graph is found, the node alignment between the two graphs can still be ambiguous. Therefore, the system includes NeuroAlign which computes node-to-node attention based on graph node embeddings to obtain the alignment results. Finally, the matching target graphs and corresponding matching nodes are provided to the user visually (e.g., on display 132) for interactive exploration and analysis.

GNN is used as the backbone of the subgraph matching and node alignment models. The general idea of the GNN is to learn latent representations of graph nodes, such that they can incorporate node attribute and topological information from their surrounding neighborhoods in the graph. Simplified, GNN can be used to perform representation learning, where the input is a given graph and the output is a set of embeddings at every node in the graph. Optionally a pooling layer can be added on top of the node embeddings to obtain a single embedding of the input query graph. The system 100 can use, for example, GraphSAGE architecture for graph representation learning. This is but one example; other GNN architectures can be used too.

It is desirable to perform subgraph matching in the node embedding space to facilitate efficient retrieval, where the embedding can be a vector (e.g., length of 64) that encodes both the attributes of the node, its neighbors, and the connectivity of the neighbors. However, given a large graph database, it is challenging to define a concrete task to learn the predictive model. A naive approach is to simply take random pairs of graphs in the database as learning examples and their subgraph relation-ship as labels. This approach is infeasible since testing for subgraph isomorphism even on a single pair of graphs can take a long time with heuristic method. The large size of some graphs and the overall database makes this approach even more challenging. NeuroMatch resolves this issue by decomposing the given query and target graphs into many small regions and learns the subgraph relationship in these small regions first. In particular, for each node q in the query graph, it extracts a small k-hop neighborhood graph $g_q$. For each node t in the target graph, it also extracts their k-hop neighborhood $g_t$. Then the problem of determining whether $G_Q \subseteq G_T$ transforms into many local subgraph matching decisions about whether $g_q \subseteq g_t$. To find potential local matches, NeuroMatch compares all pairs of nodes between the query and target graphs. Finally, the ensemble decision can be made by checking whether every query neighborhood can find a matching target neighborhood.

Figure 3:
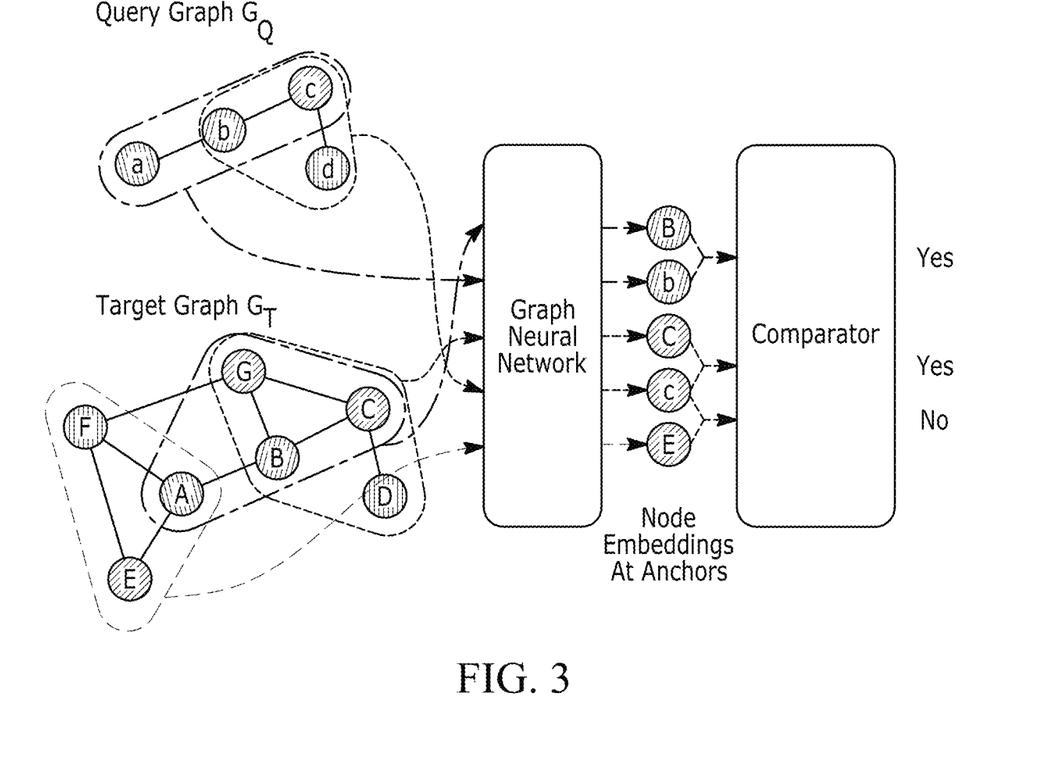
FIG. 3 is a diagram illustrating a system of determining whether the query graph is a subgraph of the target graph, according to an embodiment using a GNN.

FIG. 3 illustrates one embodiment of a system 300 for determining whether the query graph $G_Q$ is a subgraph of the target graph $G_T$, according to an embodiment. This is referred to as the NeuroMatch system. The NeuroMatch system looks for local matches between the query graph and the target graphs in the graph database, and then aggregates the results. In FIG. 3, boundary lines are drawn around the 1-hop local neighborhoods of anchor nodes b and c in the query graph as an example. In other words, one line is drawn around nodes a, b, and c since nodes a and c are 1-hop neighbors from node b, and another line is drawn around nodes b, c, and d since nodes b and d are 1-hop neighbors from node c. It should be understood that similar methods may be used with 2-hop neighbors, i.e., nodes that are separated from the anchor node by one node. It should also be understood that in practice, the k-hop neighborhoods at all nodes of the query graph and the target graphs can be extracted and compared. The NeuroMatch system compares these 1-hop neighborhoods with those in each target graph in the graph database 136. In the illustrated example, the NeuroMatch algorithm finds that the 1-hop neighborhood graph of b of the query graph is a subgraph of the 1-hop neighborhood of B of the target graph, and the 1-hop neighborhood of c is a subgraph of the neighborhood of C of the target graph. In other words, the 1-hop neighbors of node b include nodes a and c, and the 1-hop neighbors of similar node B of the target graph also include nodes A and C (along with node G); the 1-hop neighborhood graph of node b is therefore a subgraph of the 1-hop neighborhood of node B. In the illustrated example, since each node a, b, c, and d can find a matching neighborhood graph in the target graph $G_T$ (nodes A, B, C, and D), the NeuroMatch algorithm concludes that indeed $G_Q$ is a subgraph of $G_T$.

The system proceeds to determine the local subgraph relationship, i.e., whether the k-hop neighborhood graph $g_q$ is a subgraph of $g_t$. To determine local subgraph relations, the NeuroMatch system feeds these 1-hop neighborhood graphs $g_q$ and $g_t$ into a GNN to extract the respective anchor node embeddings at q and t, i.e., the vector that encodes both the attributes of the node and its connectivity with other nodes. A comparator function takes each pair of these embeddings and predicts the subgraph relationship as shown in FIG. 3 to make local decisions. The comparator enforces the embeddings of the neighborhoods to follow certain order if the subgraph relationship exists. In the illustrated example, the comparator notes a correspondence of neighbors in similar nodes B and b, and a correspondence of neighbors in similar nodes C and c. The comparator is also configured to determine when a match is not present. For example, in the illustrated embodiment of FIG. 3, a 1-hop neighborhood of node E is computed, determining nodes F and A are included in this neighborhood. The comparator notes that the anchor node E does not have a 1-hop neighborhood that compares with node c, and thus no match is made. The process can repeats for each node in the query graph and the target graph.

Training this NeuroMatch system 300 can utilize training data 112 and involve sampling large amounts of mini-batches containing both positive and negative pairs. A positive pair consists of two neighborhood graphs $g_q$ and $g_t$ that satisfy the subgraph relationship. Since $g_q$ is contained in $g_t$, $g_t$ is sampled first. Specifically, for each target graph $G_T$ in the graph database, a random anchor node t is sampled, and the k-hop neighborhood is extracted as $g_t$. Then a subgraph within $g_t$ is sampled as the query neighborhood $g_q$.

Negative samples can be critical to distinguish true subgraph isomorphisms as it provides examples when the subgraph relationship is violated. From target neighborhood $g_t$ sampled above, a smaller neighborhood is sampled from a different graph as $g_q$. The query neighborhood gq needs to be verified with exact matching protocol to ensure $g_q \not\subseteq g_t$. In practice, we find that these negatives alone pose an easy task for the model and the training results in many false positive predictions of the matching target graphs. To alleviate this issue, the system also samples hard negatives which are obtained by perturbing the above positive pair ($g_q \subseteq g_t$) such that the subgraph relationship no longer exists. The system perturbs the positive pair by randomly adding edges to $g_q$ and verifies the success with exact matching. As can be seen, negative sampling extensively invokes exact matching algorithm, which is slow to compute. To keep the training tractable, the system can set small neighborhood hop k=3 (at most) for example, and can also limit the number of nodes to sample from the neighborhood to, for example 30.

After the model is trained, the system pre-computes and stores embeddings of all graphs in the database. The inference process iterates through all pairs of query nodes and target nodes, and utilizes the trained comparator to make local subgraph decisions. The aggregated decision is then made by checking whether each query neighborhood finds a match. This process has linear complexity in terms of both query and target number of nodes, thus facilitating efficient retrieval at the front-end interface.

When a matching target graph is retrieved and visualized, it may still be difficult for the user to extract insights when the target graph is large and the topology is complex. In this case showing the corresponding nodes can provide intuitive and explainable visual cues. Although NeuroMatch can provide node correspondence when the neighborhoods match at their anchor nodes (i.e. $q \in g_q$ and $t \in g_t$), the overall alignment can still be ambiguous and misleading based on what we observe in the experimental results. This is due to the fact that the learning process of NeuroMatch relies entirely on small neighborhoods within the graphs. As a result, each query node could end up matched to multiple target nodes where many of them may be false positives.

Figure 4:
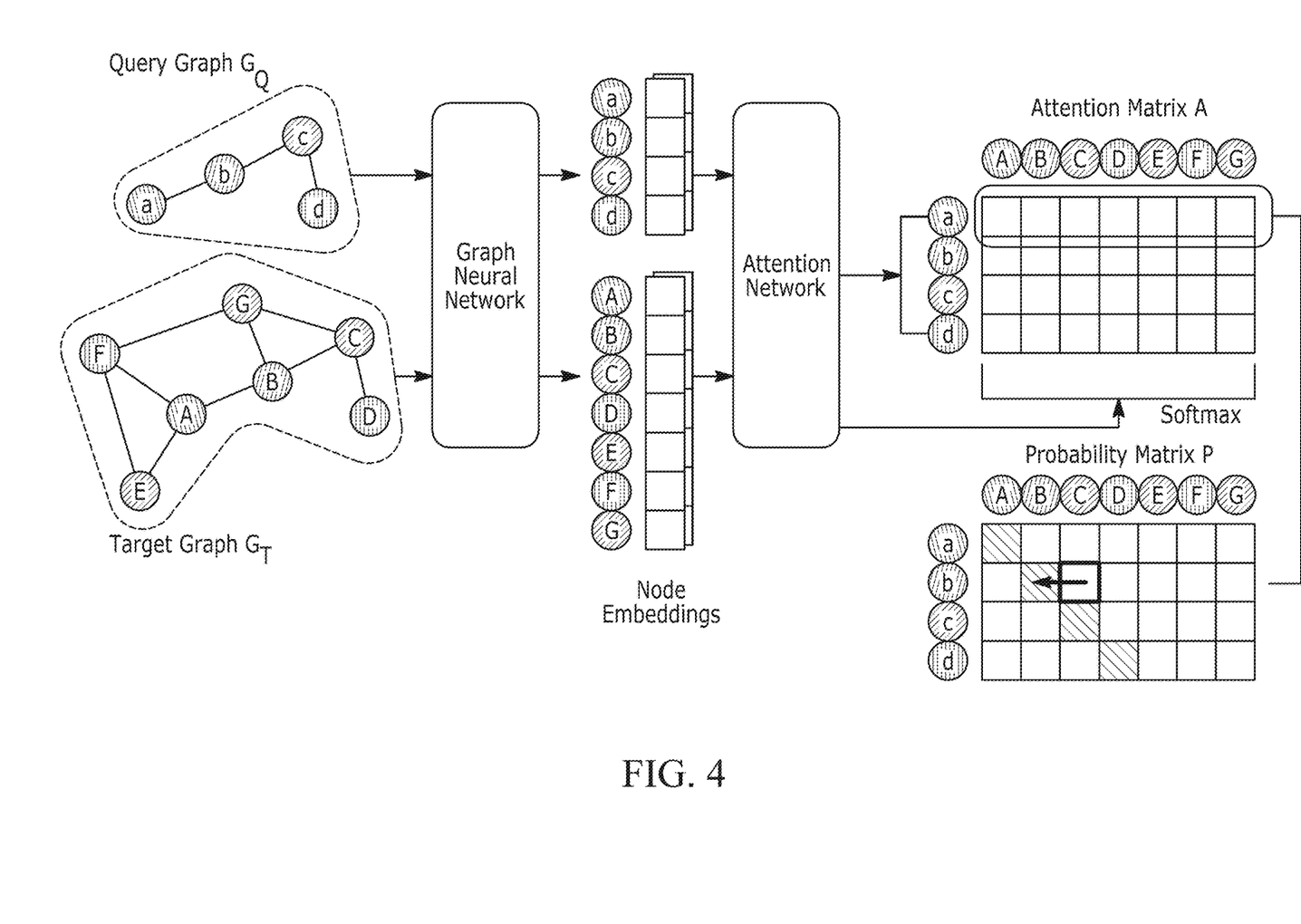
FIG. 4 is a diagram illustrating a system of obtaining node-to-node correspondence between the query graph and the target graph, according to an embodiment using a GNN and an attention network.

The NeuroAlign system works to solve this by directly predicting matching nodes on the entire query and target graphs, without needing to segment them into small neighborhoods. FIG. 4 illustrates an over of the NeuroAlign system, i.e. a system 400 configured to obtain accurate node-to-node correspondence. The system 400 extracts embeddings of each node in the query graph and the target graph by directly feeding them through a GNN. It then uses an attention network to compare every pair of node embeddings between the query and target graphs. These pair-wise comparison results can be formed as a matrix, with the rows corresponding to query nodes and columns corresponding to target nodes. The matrix is then transformed into a probability matrix through softmax on each row. A greedy assignment algorithm resolves potential conflicts (illustrated by the outlined box) during inference. The system 400 improves node alignment performance.

In more particular terms, the system 400 employs a flexible, cross-graph attention mechanism. As shown in FIG. 4, the processor(s) implementing the NeuroAlign system directly takes the node embeddings obtained from GNN on the entire graphs $G_Q$ and $G_T$. These embeddings are denotes as $\{h_q, \forall q \in G_Q\}$ and $\{h_t, \forall t \in G_T\}$. The system 400 then computes the similarity between each query embedding and every target embedding through an attention network. This process can be considered as creating an attention matrix $A \in \mathbb{R}^{|V_Q| \times |V_T|}$, where the element $A_{q,t}$ contains the attention from node q to t. The system then directly transforms the similarity matrix to a probability matrix $P \in \mathbb{R}^{|V_Q| \times |V_T|}$ using row-wise softmax in the cross-entropy loss. Formally, the system uses the following relationships:

$$A_{q,t} = \psi(h_q \| h_t)$$

$$P_q = \text{softmax}(a_q)$$

$$L(G_Q, G_T) = -\Sigma_{q \in G_Q} y_q \log(p_q)$$

where $\psi$ denotes the attention network, $a_q$ is the q-th row of A, and $y_q$ is the one-hot ground-truth label for node q, indicating which node in $G_T$ is the corresponding node of q. The prediction $P_q$ contains the probabilities of matching query node q to every target nodes. The system implements the attention network as a multi-layer perceptron, which takes a pair of embeddings produced by the GNN, concatenate the embeddings, and returns a similarity score between a node q in the query graph and a node t in the target graph. In case $G_T$ is too large, the computation of $A_{q,t}$ could consume too much memory and needs to be constrained to a subgraph t. In application, a user can specify the maximum size which covers most target graphs in the graph database.

Similar to NeuroMatch, for NeuroAlign, when the model is trained, the system can pre-compute all graph embeddings generated by NeuroAlign to make the retrieval process efficient. The embeddings of the nodes are not fixed, but rather are learned through the network training process. With NeuroAlign, after the training completes, the model is able to look at a pair of embeddings from the query nodes and target nodes, and infer whether they are a match or not.

In addition, NeuroAlign works subsequently to NeuroMatch and only activates when a subgraph relationship is predicted, thus creating minimal computational overhead for visualization and interaction.

The training of NeuroMatch and NeuroAlign can be conducted separately, e.g., via separate training data 112. Training NeuroAlign (and its backbone GNN, such as GraphSAGE), can be simpler than training NeuroMatch. It can involve sampling only positive pairs, such that its objective is to improve node alignment when the subgraph decision has already been made that $G_Q \subseteq G_T$. Therefore, the sampling involves extracting random queries from the graphs in the database. For each target graph in the database, the training module can randomly sample a subgraph within it as $G_Q$. The ground-truth injection mapping is acquired directly in the sampling process, and it is converted to $y_q$ to indicate which node in the target graph is the corresponding node of q. NeuroAlign can be trained efficiently through this simple sampling process and without invoking expensive exact matching algorithms. In addition, NeuroAlign works subsequently to NeuroMatch and only activates when a subgraph relationship is predicted, thus creating minimal computational overhead for visualization and interaction.

As stated earlier, a greedy assignment for inference can be provided. During inference, ideally the query nodes need to be matched to unique target nodes. This can be achieved with a node assignment algorithm. Specifically, given the predicted probability matrix P, the system iterates the probabilities in descending order and records the corresponding matching pair only when both the query and target nodes have not been assigned. The iteration stops when all query nodes have been assigned. This simple process resolves conflicting assignment to the same target node and improves the overall node alignment performance.

In addition to the retrieval results obtained from the query graph, the system provides the option to perform approximate query matching. This method perturbs the query graph slightly, in order to obtain similar, but different matching graphs. Specifically, the system denotes the set of obtained matches from the original query graph $G_Q$ as R. One node and its associated edges are removed from $G_Q$ to obtain the perturbed query $\tilde{G}_Q$. Then the system conducts the search with NeuroMatch on $\tilde{G}_Q$ and adds the novel matches to R. The system continues the iteration by removing a node from $\tilde{G}_Q$, until either a pre-specified maximum number of steps is reached or $\tilde{G}_Q$ becomes disconnected. To lower the change of getting a disconnected graph, each time the system can remove the node with the lowest degree in $\tilde{G}_Q$.

Figure 5:
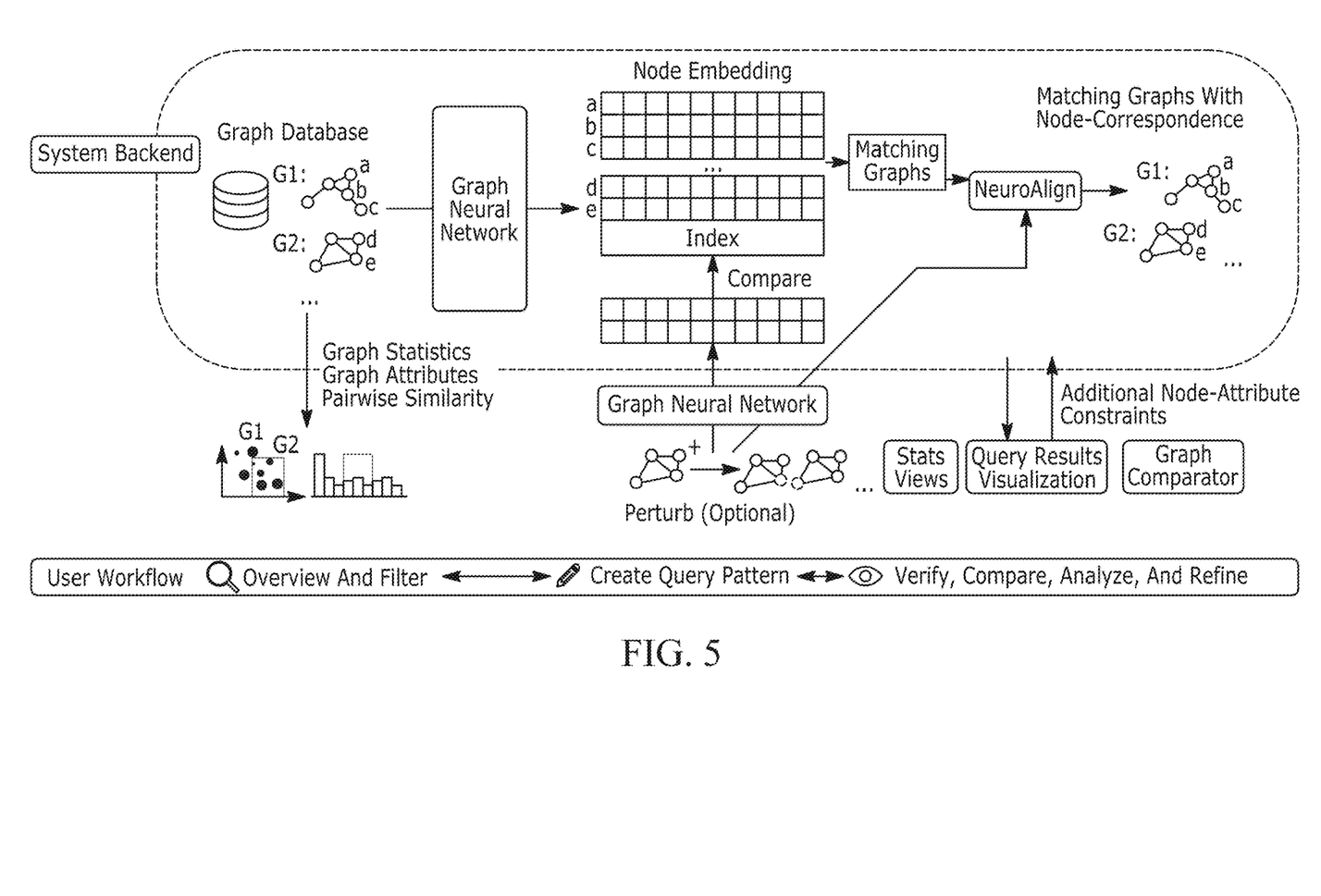
FIG. 5 illustrates an architecture of a system that performs subgraph pattern searching with human-in-the-loop visual analytics incorporating the systems of FIGS. 3 and 4, according to an embodiment.

FIG. 5 illustrates an example an architecture of a system 500 that performs subgraph pattern searching with human-in-the-loop visual analytics incorporating the systems (e.g., NeuroMatch and NeuroAlign) described herein. In general, the back-end precomputes and stores the graph representations to support efficient matching graph retrieval through NeuroMatch utilizing a first GNN. After the matching graphs are obtained, the system uses NeuroAlign and a second GNN to obtain accurate node-to-node correspondence to be displayed in the visualization provided on the user interface (e.g., graphical depiction on display 132) for the user to verify the results. The user workflow shows how the system would appear to the user; the user can start from an overview of all the graphs in the graph database and select one to construct an example based query pattern. The query pattern can be slightly perturbed to retrieve approximate matching results from the graph database. After the results are returned, the user can use a verity of views on the visualization to explore the returned results. The query results can be displayed in the front-end with multiple levels of detail that can be zoomed in/out by the user for different levels of details, and can be refined further by adding node-attribute constraints interactively in the query panel of the user interface.

The systems and methods disclosed with reference to FIGS. 1-5 can be applied to image retrieval. This can be useful for many computer vision tasks such as image retrieval, visual question answering, relationship modeling, and image generation. As one example, as stated earlier, suppose a user wants to find all images in the image database that show pedestrians walking on a crosswalk. The user can thus define an input query graph as selecting nodes that include "pedestrian" and "crosswalk", with an edge connecting those nodes such as "walking on" or "on" or "adjacent" or "above" or the like. The system can search for a corresponding target graph in the graph database 126 that has a matching subgraph therein that corresponds to the input query graph. The image from the image database corresponding to this target graph can be shown to the user so that the user can see the image with the pedestrian on the crosswalk.

To enable such an image retrieval system, the graph database 126 must first be built to store a plurality of semantic scene graphs of images. Each image contains ground-truth labels such as "tree," "grass," "wall," vehicle," and the like. To obtain a semantic scene graph from an image, several algorithms can be used, such as the known Quickshift image segmentation system which segments the image into partitions (i.e., super-pixels). Then the system derives each semantic label as the most frequent ground-truth label of all pixels inside the corresponding super-pixel. Each super-pixel is mapped to a graph node with the semantic attribute.

Once the image is segmented into partitions, the image (either raw or segmented) can be provided to the user in the user interface. The user can select various segments of the image to build a query graph, with each selected segment of the image corresponding to a node. The system can then run according to the description provided above with reference to FIGS. 1-5 to retrieve one or more target graphs that contain the query graph, and produce the image that corresponds to that target graph.

Figure 6:
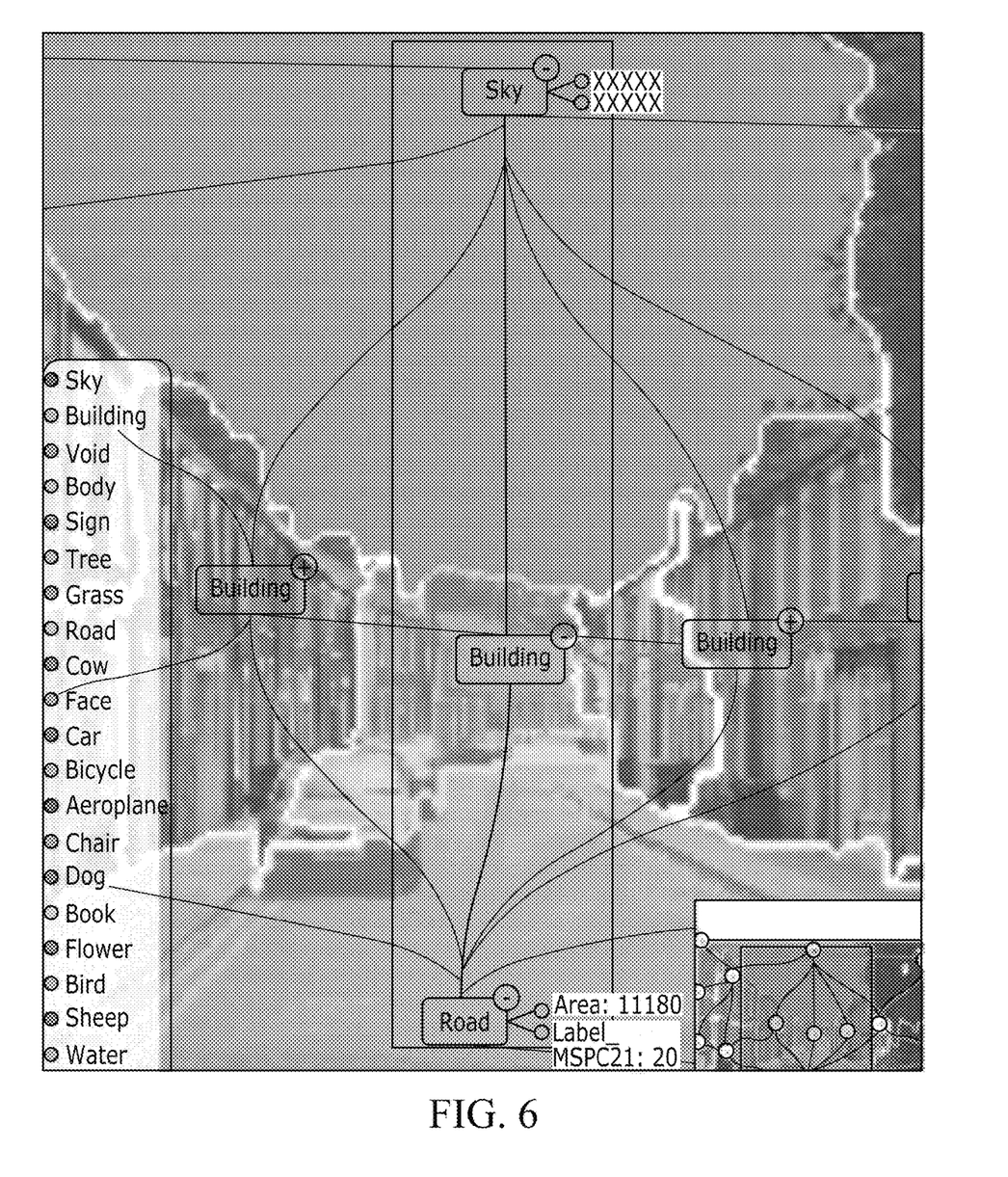
FIG. 6 illustrates regions or panels within a human-interactive graphical user interface for allowing the user to build a query graph by selecting regions of an image, and correspondingly providing the user with matching target images associated with target graphs that contain the query graph, according to an embodiment.

FIG. 6 provides an example of an interactive user interface allowing visualization of the systems described herein. The user interface allows the user to interactively select and refine query graph patterns by selecting segments (nodes) of an image, and output to the user corresponding images stored in the database that have associated target graphs containing the query graph. In the example shown in FIG. 6, labeled in region a, the user has selected "sky," "building," and "road" as three nodes of a query graph. The edges connecting these nodes might include information such as the sky being above the building, and the building being above the road. Depth information may also be provided, and the image analysis need not be only in two-dimensions. These nodes and edges infers that the intent of the user is to see all images stored in the database that have a similar appearance, e.g., a sky above a building which is above the road. This subgraph structure could indicate a typical city environment with buildings and road.

The backend of the system (e.g., running the systems described with reference to FIGS. 1-5) returns matched results of 25 target graphs in this example, labeled in region b. A user can scroll through the list of matched results, with each result showing a small-scale version of the images corresponding to the target graphs. Each of the matched results contain the same subgraph: a view of interconnected super-pixels of sky, building, and road. The user can select any one of these matched results to enlarge the image. The labeled region c of FIG. 6 shows a histogram overview of the aggregated matched result target graphs. The user can also sort by different metrics and filter by different node information such as area range, or even super-pixel location within the image. For example, the user can specify that the building is located in the bottom right corner of the image, or that an animal is adjacent a vehicle, or that a pedestrian is on a crosswalk. Through these interactions, the user can eventually find target images of interest tailored to the needs of the user.

Figure 7:
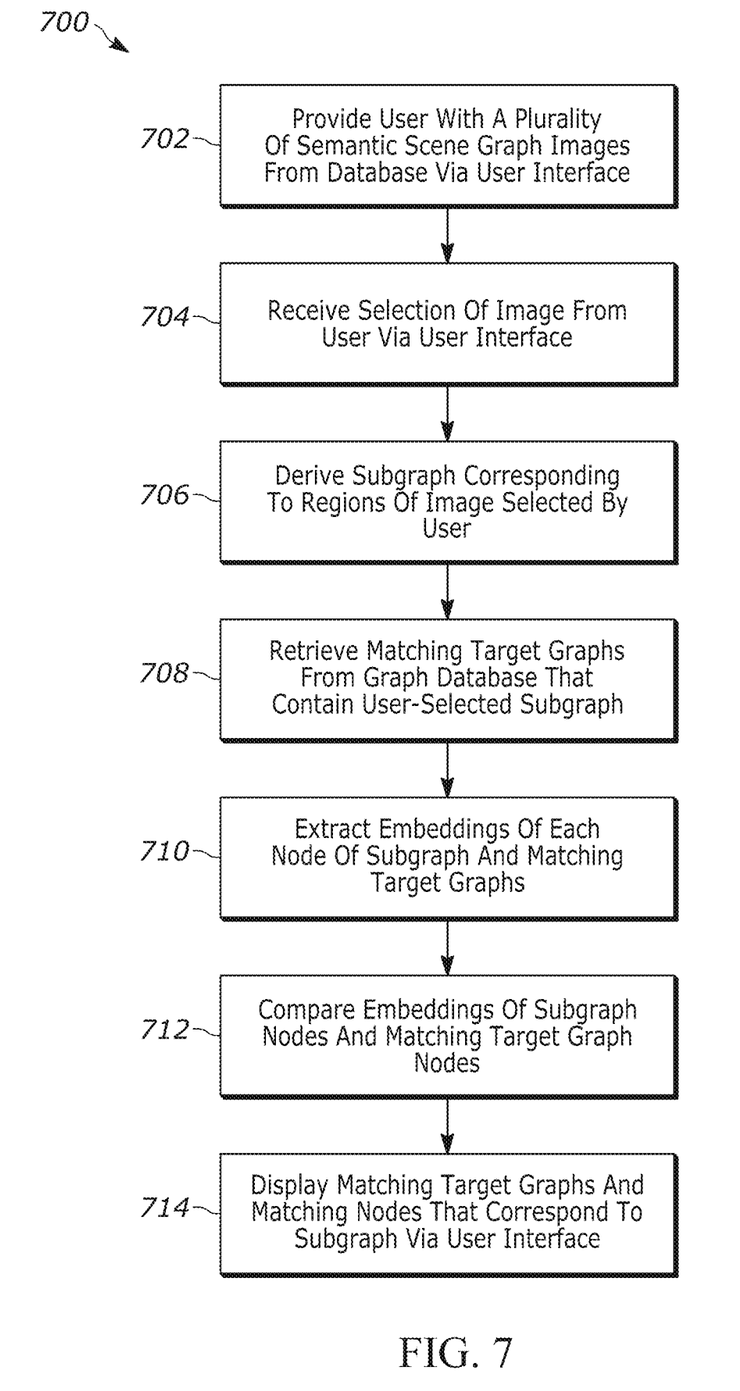
FIG. 7 illustrates a flow chart implemented by a processor for carrying out the systems disclosed herein, according to an embodiment.

FIG. 7 illustrates a flowchart that can be carried out by the processor(s) described herein. At 702, the processor(s) provides the user with a plurality of semantic scene graph images on the user interface. The semantic scene graph images may be stored in an image database in the memory disclosed herein. Each image stored in the image database may have an associated graph stored in the graph database 136. For example, each image may have segmented regions provided with labels (e.g., car, building), wherein each labeled region corresponds with a node of a graph stored in the graph database.

At 704, the processor(s) receives a selection of an image by the user. In practice, the user selects one of the images from the plurality of semantic scene graph images. At 706, the processor(s) derive a subgraph corresponding to regions of the image that was selected by the user. This can be based on user selection. For example, the user can select one or more of the segmented regions within the selected image to build a query graph. The user can brush a subgraph, for example, three connected nodes such as the sky, a building, and a road such as shown in region a of FIG. 6.

At 708, the processor(s) retrieve matching target graphs from the graph database that contain the user-selected subgraph. The user-selected subgraph built the user represents the query graph. The processor(s) retrieve all stored target graphs that contain this query graph therein. At 710, processor(s) extracts embeddings of each node of the query graph and each node of the matching target graphs. Each node corresponds to a labeled segmented region of the image that was selected by the user. For example, the sky selected by the user corresponds to a node that, in turn, matches with all nodes corresponding to sky in the target graphs. At 712, the processor(s) compares the embeddings of the query graph nodes and the embeddings of the matching target graph nodes. This can be done on a one-to-one node basis, utilizing an attention network for example. At 714, the processor(s) displays, on the user interface (e.g., display controlled by input device such as mouse) the matching target graphs that contain the query graph. This is shown in, for example, region b of FIG. 6. Each node of the matching target graph that correspond to the query graph can be highlighted in the image. For example, the regions of the image and/or its label that match the query graph nodes can be highlighted or otherwise presented to the user for ease of comparison. A one-to-one node comparison between the nodes of the query graph and the matching nodes of the matching target graphs may be provided to the user.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for performing an interactive image scene graph pattern search, the computer-implemented method comprising:
   providing a human user with an image, wherein the image is pre-processed to include a plurality of segmented regions that are able to be selected by the user via a user interface;
   receiving a selection of one or more of the segmented regions via the user interface;
   building a query graph based on the selected segmented regions, wherein each of the one or more of the segmented regions selected by the user corresponds to a query node of the query graph;
   via a graph neural network, retrieving matching target graphs that contain the query graph from a target graph database, wherein each matching target graph has matching target nodes that match with the query nodes of the query graph;
   retrieving matching target images from an image database that are associated with the matching target graphs;
   extracting embeddings of each of the query nodes and each of the matching target nodes;

performing a comparison of the embeddings of each query node with the embeddings of each matching target node; and displaying on the user interface the matching target images that are associated with the matching target graphs simultaneously along with the matching target graphs and along with a simultaneous graphical depiction of the query nodes and the matching target nodes, wherein the graphical depiction enables the user to compare the query nodes with the matching target nodes on the user interface.

2. The computer-implemented method of claim 1, wherein the graphical depiction includes a one-to-one node correspondence between the query nodes and the matching target nodes, wherein the one-to-one node correspondence is displayed on the user interface enabling the user to compare the query nodes with the matching target nodes on the user interface.

3. The computer-implemented method of claim 1, wherein the segmented regions that are able to be selected by the user include at least one of a road, a building, a tree, a pedestrian, and a road sign.

4. The computer-implemented method of claim 1, wherein the embeddings of each of the query nodes and each of the matching target nodes include attributes of that node, attributes of a neighboring node connected to that node, and attributes of a connection between that node and the neighboring node.

5. The computer-implemented method of claim 1, wherein the step of performing utilizes an attention network.

6. The computer-implemented method of claim 1, wherein the step of performing is done without segmenting the query graph and the matching target graphs into neighborhoods of adjacent nodes.

7. A system configured to support interactive image scene graph searching, the system comprising:
a user interface;
a memory storing a target graph database having a plurality of target graphs, each target graph having a plurality of target nodes connected by edges, the memory further storing a target image database having a plurality of target images, each target image associated with a respective one of the target graphs; and
a processor programmed to:
provide a human user with an image, wherein the image is pre-processed to include a plurality of segmented regions that are able to be selected by the user via the user interface;
receive a selection of one or more of the segmented regions via the user interface;
build a query graph based on the selected segmented regions, wherein each of the one or more of the segmented regions selected by the user corresponds to a query node of the query graph;
via a graph neural network, retrieve matching target graphs that contain the query graph from the target graph database, wherein each matching target graph has matching target nodes that match with the query nodes of the query graph;
retrieve matching target images from the target image database that are associated with the matching target graphs;
extract embeddings of each of the query nodes and each of the matching target nodes;
perform a comparison of the embeddings of each query node with the embeddings of each matching target node; and
display on the user interface the matching target images that are associated with the matching target graphs simultaneously along with the matching target graphs and along with a simultaneous graphical depiction of the query nodes and the matching target nodes, wherein the graphical depiction enables the user to compare the query nodes with the matching target nodes on the user interface.

8. The system of claim 7, wherein the processor is further programmed to utilize a second graph neural network to compare the query nodes with the matching target nodes of the matching target graphs.

9. The system of claim 8, wherein the processor is further programmed to determine a similarity between the query nodes and the matching target nodes of the matching target graphs.

10. The system of claim 7, wherein the processor is further programmed to: utilize an attention network to compare the embeddings of each query node with the embeddings of each matching target node of the matching target graphs.

11. The system of claim 7, wherein the processor is further programmed to produce the graphical depiction on the user interface that includes a one-to-one node correspondence between the query nodes and the matching target nodes of the matching target graphs.

12. The system of claim 7, wherein the processor is further programmed to determine a similarity between the query nodes and the matching target nodes of the matching target graphs with a one-to-one node correspondence.

13. The system of claim 12, wherein the processor is further programmed to generate the graphical depiction of the one-to-one node correspondence.

14. The system of claim 7, wherein the segmented regions include at least one of a building, a pedestrian, and a vehicle.

15. A system comprising:
a memory storing a target graph database having a plurality of target graphs, each target graph having a plurality of target nodes connected by edges; and
a processor communicatively connected to the memory and programmed to:
provide a human user with an image, wherein the image is pre-processed to include a plurality of segmented regions that are able to be selected by the user via a user interface;
receive a selection of one or more of the segmented regions via the user interface;
build a query graph based on the selected segmented regions, wherein each of the one or more of the segmented regions selected by the user corresponds to a query node of the query graph;
via a graph neural network, retrieve matching target graphs that contain the query graph from the target graph database, wherein each matching target graph has matching target nodes that match with the query nodes of the query graph;
retrieve matching target images from a target image database that are associated with the matching target graphs;
extract embeddings of each of the query nodes and each of the matching target nodes;
perform a comparison of the embeddings of each query node with the embeddings of each matching target node; and
display on the user interface the matching target images that are associated with the matching target graphs simultaneously along with the matching target graphs and along with a simultaneous graphical depiction of the query nodes and the matching target nodes, wherein the graphical depiction enables the user to compare the query nodes with the matching target nodes on the user interface.

16. The system of claim 15, wherein the processor is further programmed to utilize a second graph neural network to determine the similarity between the query nodes and the matching target nodes of the one or more matching target graphs.

17. The system of claim 15, wherein the processor is further programmed to utilize an attention network to compare the embeddings of each query node with the embeddings of each matching target node of the matching target graphs.

* * * * *